United States Patent
Hsieh et al.

(10) Patent No.: US 10,283,992 B2
(45) Date of Patent: May 7, 2019

(54) ENERGY MANAGEMENT SYSTEM

(71) Applicants: LITE-ON ELECTRONICS (GUANGZHOU) LIMITED, Guangzhou (CN); LITE-ON TECHNOLOGY CORP., Taipei (TW)

(72) Inventors: Ming-Tsung Hsieh, Taipei (TW); Yi-Chao Fan, Taipei (TW); Po-Jung Tseng, Taipei (TW); Shang-Jin Yan, Taipei (TW); Yu-Kang Lo, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 308 days.

(21) Appl. No.: 15/229,331

(22) Filed: Aug. 5, 2016

(65) Prior Publication Data
US 2017/0264125 A1    Sep. 14, 2017

(30) Foreign Application Priority Data
Mar. 11, 2016  (CN) .......................... 2016 1 0139576

(51) Int. Cl.
    *H02J 7/00*    (2006.01)
(52) U.S. Cl.
    CPC ............ *H02J 7/0068* (2013.01); *H02J 7/007* (2013.01); *H02J 7/0022* (2013.01)

(58) Field of Classification Search
    CPC ......... H02J 7/0068; H02J 7/0022; H02J 7/007
    See application file for complete search history.

(56) References Cited

U.S. PATENT DOCUMENTS

| | | | | |
|---|---|---|---|---|
| 2011/0112703 A1* | 5/2011 | Lundberg | ............... | G06Q 10/00 700/297 |
| 2013/0162196 A1* | 6/2013 | Li | .......................... | H02J 7/041 320/107 |
| 2017/0025878 A1* | 1/2017 | Tsai | ..................... | H02J 7/0068 |

FOREIGN PATENT DOCUMENTS

TW         I560982 B  *  7/2015  ............. G01R 31/36

* cited by examiner

*Primary Examiner* — Drew A Dunn
*Assistant Examiner* — Sailesh Thapa
(74) *Attorney, Agent, or Firm* — Rosenberg, Klein & Lee

(57) ABSTRACT

An energy management system includes a power supply module, a charging module, an interface module and an energy management module. The power supply module provides an input power. The charging module generates, based on the input power, a first charge power and a second charge power in response to a first charge control signal and a second charge control signal. The interface module detects electrical energy stored in an energy storage device to generate a detection result. In response to the detection result, the energy management module determines an operating state of the energy storage device, and generates one of the first and second charge control signals.

18 Claims, 2 Drawing Sheets

ENERGY MANAGEMENT SYSTEM

CROSS-REFERENCE TO RELATED APPLICATION

This application claims priority of Chinese Patent Application No. 201610139576.5, filed on Mar. 11, 2016.

FIELD

The disclosure relates to a management system, and more particularly to an energy management system.

BACKGROUND

A conventional charging system may only be able to charge an energy storage device of a predetermined type, and may not be able to detect a voltage of the energy storage device and determine, in response to the detected voltage, an operating state (e.g., a charging state, a standby state or a discharging state) of the energy storage device. When energy storage devices of different types are to be charged, multiple conventional charging systems dedicated to respectively charge these energy storage devices must be used.

SUMMARY

Therefore, an object of the disclosure is to provide an energy management system that can alleviate at least one of the drawbacks of the prior art.

According to the disclosure, the energy management system includes a power supply module, a charging module, an interface module and an energy management module. The power supply module provides an input power. The charging module is coupled to the power supply module for receiving the input power therefrom, receives a first charge control signal and a second charge control signal, and generates, based on the input power, a first charge power and a second charge power in response to the first and second charge control signals, respectively. The interface module is used to be coupled to an energy storage device, and detects electrical energy stored in the energy storage device to generate a detection result. The energy management module is coupled to the charging module and the interface module, and receives the detection result from the interface module. In response to the detection result, the energy management module determines an operating state of the energy storage device, and generates one of the first and second charge control signals for the charging module.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
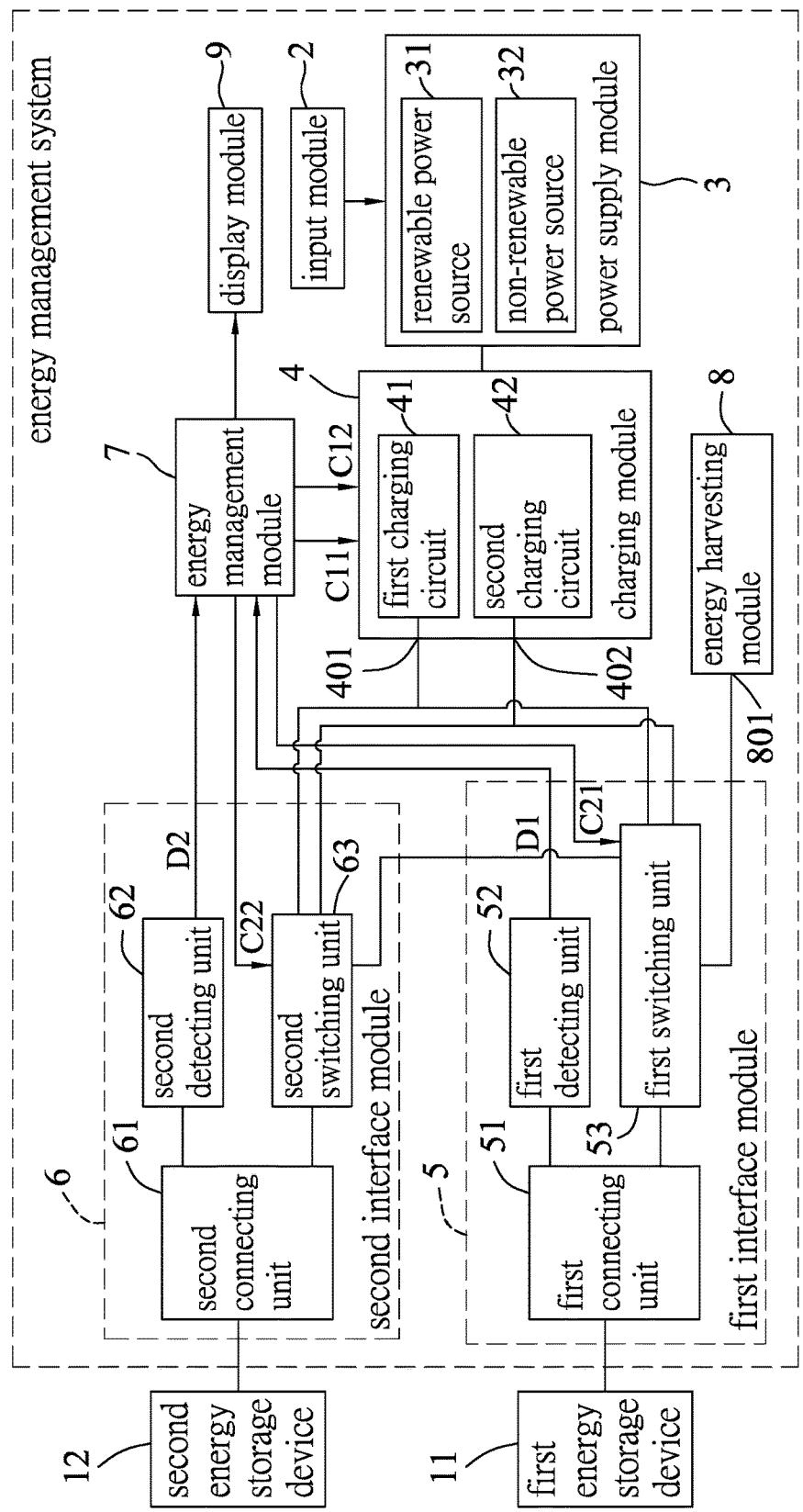
FIG. 1 is a block diagram illustrating a first embodiment of an energy management system according to the disclosure.

Referring to FIG. 1, a first embodiment of an energy management system according to the disclosure is used to charge and discharge each of a first energy storage device 11 and a second energy storage device 12 that are of different types. For example, the first energy storage device 11 is used in a smart phone (not shown), and the second energy storage device 12 is used in a home appliance (not shown). The energy management system of this embodiment includes an input module 2, a power supply module 3, a charging module 4, a first interface module 5, a second interface module 6, an energy management module 7, an energy harvesting module 8 and a display module 9.

The input module 2 is operable to generate an input signal.

The power supply module 3 includes a renewable power source 31 and a non-renewable power source 32, is coupled to the input module 2 for receiving the input signal therefrom, and enables, in response to the input signal, one of the renewable power source 31 and the non-renewable power source 32 to provide an input power.

The charging module 4 is coupled to the power supply module 3 for receiving the input power therefrom, and receives a first charge control signal (C11) and a second charge control signal (C12). The charging module 4 has a first output terminal 401 and a second output terminal 402. The charging module 4 generates, based on the input power, a first charge power and a second charge power in response to the first and second charge control signals (C11, C12), respectively, and outputs the first and second charge powers respectively at the first and second output terminals 401, 402. In this embodiment, the charging module 4 includes a first charging circuit 41 and a second charging circuit 42. The first charging circuit 41 is coupled to the first output terminal 401, generates, based on the input power, the first charge power in response to the first charge control signal (C11), and outputs the first charge power at the first output terminal 401. The second charging circuit 42 is coupled to the second output terminal 402, generates, based on the input power, the second charge power in response to the second charge control signal (C12), and outputs the second charge power at the second output terminal 402. It is worth noting that each of the first and second charge powers may be outputted in a form of a constant current or a constant voltage.

The energy harvesting module 8 has an input terminal 801, and is capable of receiving energy at the input terminal 801.

The first interface module 5 includes a first connecting unit 51, a first detecting unit 52 and a first switching unit 53. The second interface module 6 includes a second connecting unit 61, a second detecting unit 62 and a second switching unit 63.

The first connecting unit 51 is for being detachably coupled to the first energy storage device 11. The second connecting unit 61 is for being detachably coupled to the second energy storage device 12.

The first detecting unit 52 is coupled to the first connecting unit 51, and detects electrical energy stored in the first energy storage device 11 to generate a first detection result (D1) when the first connecting unit 51 is coupled to the first energy storage device 11. In this embodiment, the first detection result (D1) indicates a voltage of the first energy storage device 11, and an estimated remaining use time for the first energy storage device 11 (e.g., a time for which the first energy storage device 11 can support operation of the smart phone).

The second detecting unit 62 is coupled to the second connecting unit 61, and detects electrical energy stored in the second energy storage device 12 to generate a second detection result (D2) when the second connecting unit 61 is coupled to the second energy storage device 12. In this embodiment, the second detection result (D2) indicates a voltage of the second energy storage device 12, and an estimated remaining use time for the second energy storage device 12 (e.g., a time for which the second energy storage device 12 can support operation of the home appliance).

The first switching unit 53 is coupled to the first connecting unit 51, the second switching unit 63, the first and second output terminals 401, 402 of the charging module 4 and the input terminal 801 of the energy harvesting module 8, and receives a first path control signal (C21) from the energy management module 7. The first switching unit 53 is operable to establish, in response to the first path control signal (C21), electrical connect ion between the first connecting unit 51 and one of the second switching unit 63, the first and second output terminals 401, 402 of the charging module 4 and the input terminal 801 of the energy harvesting module 8, or between the second switching unit 63 and the input terminal 801 of the energy harvesting module 8.

The second switching unit 63 is coupled to the second connecting unit 61, the first switching unit 53 and the first and second output terminals 401, 402 of the charging module 4, and receives a second path control signal (C22) from the energy management module 7. The second switching unit 63 is operable to establish, in response to the second path control signal (C22), electrical connection between the second connecting unit 61 and one of the first switching unit 53 and the first and second output terminals 401, 402 of the charging module 4.

The energy management module 7 is coupled to the charging module 4, the first and second detecting units 52, 62, the first and second switching units 53, 63 and the display module 9, and receives the first and second detection results (D1, D2) respectively from the first and second detecting units 52, 62. The energy management module 7 provides the first and/or second charge control signals (C11, C12) for the charging module 4, and provides the first and second path control signals (C21, C22) respectively for the first and second switching units 53, 63. In response to the voltage of the first energy storage device 11 as indicated by the first detection result (D1), the energy management module 7 determines an operating state of the first energy storage device 11, and generates one of the first and second charge control signals (C11, C12). In response to the voltage of the second energy storage device 12 as indicated by the second detection result (D2), the energy management module 7 determines an operating state of the second energy storage device 12, and generates one of the first and second charge control signals (C11, C12). In this embodiment, the operating state of each of the first and second energy storage devices 11, 12 may be determined to be a charging state, a standby state or a discharging state. The energy management module 7 generates the first and second path control signals (C21, C22) in response to the voltages of the first and second energy storage devices 11, 12 as indicated respectively by the first and second detection results (D1, D2). The energy management module 7 further outputs energy management information, which includes the first and second detection results (D1, D2) and the operating states of the first and second energy storage devices 11, 12, to the display module 9 for being displayed thereon.

Operations of the energy management system of this embodiment when the first energy storage device 11 is determined to be in the charging state (where the first energy storage device 11 is charged by the first charging circuit 41), in the standby state and in the discharging state are described below. When the first energy storage device 11 is determined to be in the charging state where the first energy storage device 11 is charged by the second charging circuit 42, operation of the energy management system of this embodiment can be inferred from the description below, and details thereof are omitted herein for the sake of brevity.

When the voltage of the first energy storage device 11 as indicated by the first detection result (D1) is lower than a predetermined first threshold voltage, the energy management module 7 determines that the first energy storage device 11 is in the charging state. The energy management module 7 then generates the first path control signal (C21) and the first charge control signal (C11) in such a way that the first switching unit 53 establishes electrical connection between the first connecting unit 51 and the first input terminal 401 of the charging module 4, and that the first charging circuit 41 generates the first charge power, which is associated with the first charge control signal (C11) and which is outputted in a form of a constant current, to charge the first energy storage device 11 through the first switching unit 53 and the first connecting unit 51.

When the voltage of the first energy storage device 11 as indicated by the first detection result (D1) is between the predetermined first threshold voltage and a predetermined first fully-charged voltage higher than the predetermined first threshold voltage, the energy management module 7 determines that the first energy storage device 11 is in the charging state. The energy management module 7 then generates the first path control signal (C21) and the first charge control signal (C11) in such a way that the first switching unit 53 establishes electrical connect ion between the first connecting unit 51 and the first input terminal 401 of the charging module 4, and that the first charging circuit 41 generates the first charge power, which is associated with the first charge control signal (C11) and which is outputted in a form of a constant voltage, to charge the first energy storage device 11 through the first switching unit 53 and the first connecting unit 51.

When the voltage of the first energy storage device 11 as indicated by the first detection result (D1) is between the predetermined first fully-charged voltage and a predetermined first discharge voltage higher than the predetermined first fully-charged voltage, the energy management module 7 determines that the first energy storage device 11 is in the standby state, and generates the first path control signal (C21) in such a way that the first switching unit 53 does not establish any electrical connection.

When the voltage of the first energy storage device 11 as indicated by the first detection result (D1) is higher than the predetermined first discharge voltage, the energy management module 7 determines that the first energy storage device 11 is in the discharging state, and generates the first path control signal (C21) in such a way that the first switching unit 53 establishes electrical connection between the first connecting unit 51 and the input terminal 801 of the energy harvesting module 8 so as to allow the energy harvesting module 8 to receive energy from the first energy storage device 11 through the first connecting unit 51 and the first switching unit 53. It is noted that, alternatively, the energy management module 7 may generate the first and second path control signals (C21, C22) in such a way that the first switching unit 53 establishes electrical connection between the first connecting unit 51 and the second switching unit 63 and that the second switching unit 63 establishes electrical connection between the second connecting unit 61 and the first switching unit 53, so as to allow the second energy storage device 12 that is determined to be in the charging state to receive energy from the first energy storage device 11 through the first connecting unit 51, the first switching unit 53, the second switching unit 63 and the second connecting unit 61.

Moreover, operations of the energy management system of this embodiment when the second energy storage device 12 is in the charging state where the second energy storage device 12 is charged by the second charging circuit 42, in the standby state and in the discharging state are described below. When the second energy storage device 12 is in the charging state where the second energy storage device 12 is charged by the first charging circuit 41, operation of the energy management system of this embodiment can be described from the description below, and details thereof are omitted for the sake of brevity.

When the voltage of the second energy storage device 12 as indicated by the second detection result (D2) is lower than a predetermined second threshold voltage, the energy management module 7 determines that the second energy storage device 12 is in the charging state, and generates the second path control signal (C22) and the second charge control signal (C12) in such a way that the second switching unit 63 establishes electrical connection between the second connecting unit 61 and the second input terminal 402 of the charging module 4, and that the second charging circuit 42 generates the second charge power, which is associated with the second charge control signal (C12) and which is outputted in a form of a constant current, to charge the second energy storage device 12 through the second switching unit 63 and the second connecting unit 61.

When the voltage of the second energy storage device 12 as indicated by the second detection result (D2) is between the predetermined second threshold voltage and a predetermined second fully-charged voltage higher than the predetermined second threshold voltage, the energy management module 7 determines that the second energy storage device 12 is in the charging state, and generates the second path control signal (C22) and the second charge control signal (C12) in such a way that the second switching unit 63 establishes electrical connection between the second connecting unit 61 and the second input terminal 402 of the charging module 4, and that the second charging circuit 42 generates the second charge power, which is associated with the second charge control signal (C12) and which is outputted in a form of a constant voltage, to charge the second energy storage device 12 through the second switching unit 63 and the second connecting unit 61.

When the voltage of the second energy storage device 12 as indicated by the second detection result (D2) is between the predetermined second fully-charged voltage and a predetermined second discharge voltage higher than the predetermined second fully-charged voltage, the energy management module 7 determines that the second energy storage device 12 is in the standby state, and generates the second path control signal (C22) in such a way that the second switching unit 63 does not establish any electrical connection.

When the voltage of the second energy storage device 12 as indicated by the second detection result (D2) is higher than the predetermined second discharge voltage, the energy management module 7 determines that the second energy storage device 12 is in the discharging state, and generates the first and second path control signals (C21, C22) in such a way that the first switching unit 53 establishes electrical connection between the second switching unit 63 and the input terminal 801 of the energy harvesting module 8 and that the second switching unit 63 establishes electrical connection between the second connecting unit 61 and the first switching unit 53, so as to allow the energy harvesting module 8 to receive energy from the second energy storage device 12 through the second connecting unit 61, the second switching unit 63 and the first switching unit 53. It is noted that, alternatively, the energy management module 7 may generates the first and second path control signals (C21, C22) in such a way that the first switching unit 53 establishes electrical connection between the first connecting unit 51 and the second switching unit 63 and that the second switching unit 63 establishes electrical connection between the second connecting unit 61 and the first switching unit 53, so as to allow the first energy storage device 11 that is determined to be in the charging state to receive energy from the second energy storage device 12 through the second connecting unit 61, the second switching unit 63, the first switching unit 53 and the first connecting unit 51.

It is noted that charging of the first energy storage device 11 by the first charging circuit 41 and charging of the second energy storage device 12 by the second charging circuit 42 may be performed simultaneously. In addition, the energy management system of this embodiment may further include a frame (not shown) for receiving the first and second energy storage devices 11, 12.

It is noted that, in other embodiments, when only one of the first and second energy storage devices 11, 12 is to be charged, one of the first and second charging circuits 41, 42 may generate the respective charge power in a form of a constant current to charge said one of the first and second energy storage devices 11, 12, and then the other one of the first and second charging circuits 41, 42 may generate the respective charge power in a form of a constant voltage to charge said one of the first and second energy storage devices 11, 12.

In the first embodiment, the energy management system is used to charge two energy storage devices of different types (e.g., the first and second storage devices 11, 12). However, in other embodiments, the energy management system may be modified, e.g., to include more charging circuits and more interface modules, so as to charge more energy storage devices of different types.

Figure 2:
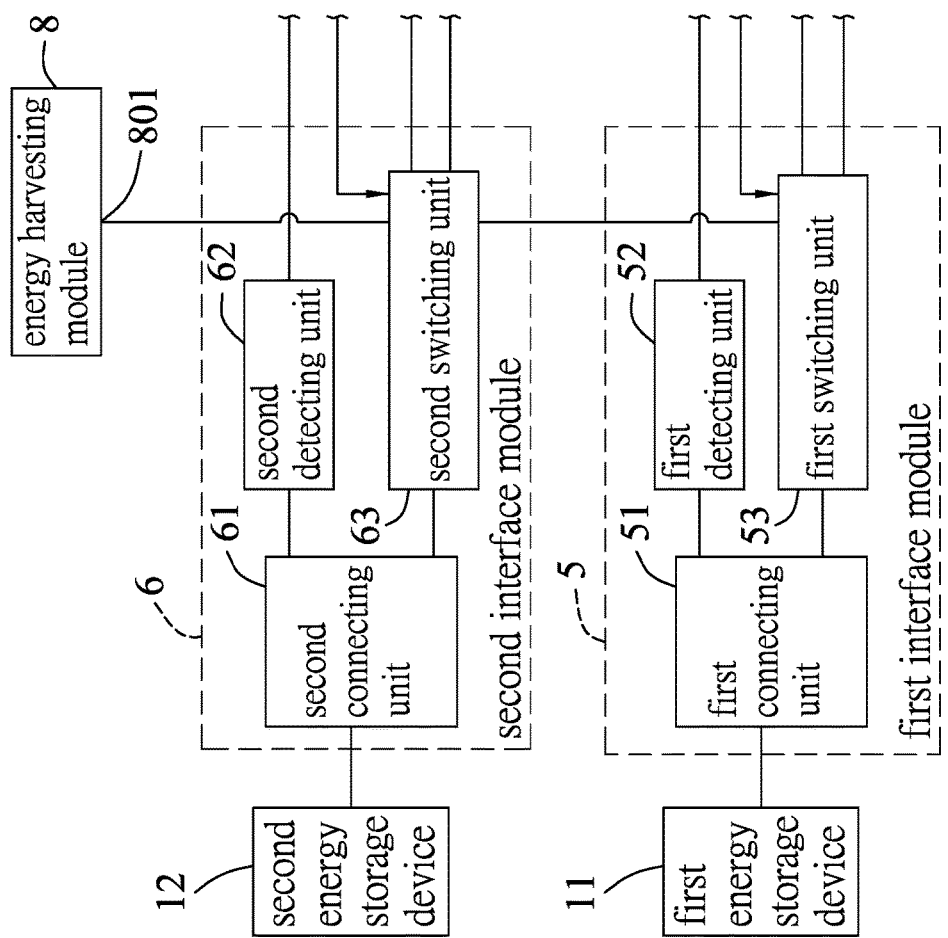
FIG. 2 is a block diagram illustrating a second embodiment of the energy management system according to the disclosure.

Referring to FIG. 2, a second embodiment of the energy management system according to the disclosure is a modification of the first embodiment, and differs from the first embodiment in that the energy harvesting module 8 is coupled to the second switching unit 63 instead of the first switching unit 53, that the energy harvesting module 8 receives energy from the first energy storage device 11 through the first connecting unit 51, the first switching unit 53 and the second switching unit 63, and that the energy harvesting module 8 receives energy from the second energy storage device 12 through the second connecting unit 61 and the second switching unit 63.

In view of the above, the energy management system of each embodiment has the following advantages:

1. The first and second energy storage devices 11, 12 of different types can be charged and discharged by the single energy management system.

2. The operating state of each of the first and second energy storage devices 11, 12 can be determined by the energy management system.

In the description above, for the purposes of explanation, numerous specific details have been set forth in order to provide a thorough understanding of the embodiment(s). It will be apparent, however, to one skilled in the art, that one or more other embodiments may practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connect ion with what is (are) considered the exemplary embodiment(s), it is understood that the disclosure is not limited to the disclosed embodiment(s) but is intended to cover various arrangements included within the spirit and scope of the broadest interpretation so as to encompass all such modifications and equivalent arrangements.

What is claimed is:

1. An energy management system comprising:
    a power supply module providing an input power;
    a charging module coupled to said power supply module for receiving the input power therefrom, receiving a first charge control signal and a second charge control signal, and generating, based on the input power, a first charge power and a second charge power in response to the first and second charge control signals, respectively;
    a first interface module used to be coupled to a first energy storage device, and detecting electrical energy stored in the first energy storage device to generate a first detection result; and
    an energy management module coupled to said charging module and said first interface module, and receiving the first detection result from said first interface module,
    wherein, in response to the first detection result, said energy management module determines an operating state of the first energy storage device, generates one of the first and second charge control signals for said charging module, and further generates a first path control signal;
    wherein said interface module includes a first connecting unit used to be detachably coupled to the first energy storage device; and
    a first switching unit that is coupled to said first connecting unit, said charging module and said energy management module, that receives the first path control signal from said energy management module, and that is operable to establish, in response to the first path control signal, electrical connection between said first connecting unit and said charging module.

2. The energy management system of claim 1, wherein said first interface module further includes:
    a first detecting unit coupled to said first connecting unit and said energy management module, and detecting the electrical energy stored in the first energy storage device to generate the first detection result for said energy management module when said first connecting unit is coupled to the first energy storage device.

3. The energy management system of claim 1, wherein when said energy management module determines the operating state of the first energy storage device to be a charging state, said energy management module generates the first path control signal and said one of the first and second charge control signals in such a way that said first switching unit establishes electrical connection between said first connecting unit and said charging module, and that said charging module generates one of the first and second charge powers, which is associated with said one of the first and second charge control signals, to charge the first energy storage device through said first switching unit and said first connecting unit.

4. The energy management system of claim 1, wherein when said energy management module determines the operating state of the first energy storage device to be a standby state, said energy management module generates the first path control signal in such a way that said first switching unit does not establish any electrical connection.

5. The energy management system of claim 1, further comprising an energy harvesting module coupled to said first switching unit,
    wherein said first switching unit is further operable to establish, in response to the first path control signal, electrical connection between said first connecting unit and said energy harvesting module, and
    when said energy management module determines the operating state of the first energy storage device to be a discharging state, said energy management module generates the first path control signal in such a way that said first switching unit establishes electrical connection between said first connecting unit and said energy harvesting module so as to allow said energy harvesting module to receive energy from the first energy storage device through said first connecting unit and said first switching unit.

6. The energy management system of claim 1, further comprising a second interface module that is used to be coupled to a second energy storage device, and that detects electrical energy stored in the second energy storage device to generate a second detection result,
    wherein said energy management module is coupled further to said second interface module for further receiving the second detection result therefrom,
    in response to the second detection result, said energy management module determining an operating state of the second energy storage device, and generating one of the first and second charge control signals.

7. The energy management system of claim 6, wherein said second interface module includes:
    a second connecting unit used to be detachably coupled to the second energy storage device; and
    a second detecting unit coupled to said second connecting unit and said energy management module, and detecting the electrical energy stored in the second energy storage device to generate the second detection result for said energy management module when said second connecting unit is coupled to the second energy storage device.

8. The energy management system of claim 7, further comprising an energy harvesting module coupled to said first switching unit,
    wherein said energy management module generates the first path control signal and a second path control signal in response to the first and second detection results,
    said second interface module further includes a second switching unit that is coupled to said second connecting unit, said first switching unit, said charging module and said energy management module, that receives the second path control signal from said energy management module, and that is operable to establish, in response to the second path control signal, electrical connection between said second connecting unit and one of said first switching unit and said charging module, and said first switching unit is further operable to establish, in response to the first path control signal, electrical connection between said first connecting unit and said energy harvesting module, electrical connection between said second switching unit and said first connecting unit, and electrical connection between said second switching unit and said energy harvesting module.

9. The energy management system of claim 8, wherein when said energy management module determines the operating state of the second energy storage device to be a discharging state, said energy management module generates the first and second path control signals in such a way that said first switching unit establishes electrical connection between said second switching unit and said energy harvesting module and that said second switching unit establishes electrical connection between said second connecting unit and said first switching unit, so as to allow said energy harvesting module to receive energy from the second energy storage device through said second connecting unit, said second switching unit and said first switching unit.

10. The energy management system of claim 8, wherein when said energy management module determines that the operating state of the second energy storage device is a discharging state and that the operating state of the first energy storage device is a charging state, said energy management module generates the first and second path control signals in such a way that said first switching unit establishes electrical connection between said second switching unit and said first connecting module and that said second switching unit establishes electrical connection between said second connecting unit and said first switching unit, so as to allow first energy storage device to receive energy from the second energy storage device through said second connecting unit, said second switching unit, said first switching unit and said first connecting unit.

11. The energy management system of claim 1, wherein the first detection result indicates a voltage of the first energy storage device, and
in response to the voltage of the first energy storage device as indicated by the first detection result, said energy management module determines the operating state of the first energy storage device, and generates said one of the first and second charge control signals.

12. The energy management system of claim 11, wherein said energy management module determines the operating state of the first energy storage device to be a charging state when the voltage of the first energy storage device as indicated by the first detection result is lower than a predetermined fully-charged voltage, to be a standby state when the voltage of the first energy storage device as indicated by the first detection result is between the predetermined fully-charged voltage and a predetermined discharge voltage higher than the predetermined fully-charged voltage, and to be a discharging state when the voltage of the first energy storage device as indicated by the first detection result is higher than the predetermined discharge voltage.

13. The energy management system of claim 12, wherein when the voltage of the first energy storage device as indicated by the first detection result is lower than a predetermined threshold voltage lower than the predetermined fully-charged voltage, said energy management module generates said one of the first and second charge control signals in such a way that one of the first and second charge powers, which is associated with said one of the first and second charge control signals, is outputted in a form of a constant current, and
when the voltage of the first energy storage device as indicated by the first detection result is between the predetermined threshold voltage and the predetermined fully-charged voltage, said energy management module generates said one of the first and second charge control signal in such a way that said one of the first and second charge powers, which is associated with said one of the first and second charge control signals, is outputted in a form of a constant voltage.

14. The energy management system of claim 1, further comprising a display module coupled to said energy management module,
wherein said energy management module further outputs energy management information, which includes the first detection result and the operating state of the first energy storage device, to said display module for being displayed thereon.

15. The energy management system of claim 1, wherein the first detection result further indicates an estimated remaining use time of the first energy storage device.

16. The energy management system of claim 1, wherein said charging module includes:
a first charging circuit generating, based on the input power, the first charge power in response to the first charge control signal; and
a second charging circuit generating, based on the input power, the second charge power in response to the second charge control signal.

17. The energy management system of claim 1, wherein said power supply module includes a renewable power source and a non-renewable power source, receives an input signal, and enables, in response to the input signal, one of said renewable power source and said non-renewable power source to provide the input power.

18. The energy management system of claim 17, further comprising an input module that is coupled to said power supply module, and that is operable to generate the input signal for said power supply module.

* * * * *